United States Patent [19]

Rosen

[11] E Re. 29,482

[45] Reissued Nov. 29, 1977

[54] CONTAINER FILLING SYSTEM

[76] Inventor: Sidney Rosen, 4119-27 Fordleigh Road, Baltimore, Md. 21215

[21] Appl. No.: 434,884

[22] Filed: Jan. 21, 1974

Related U.S. Patent Documents

Reissue of:

[64] Patent No.: 3,237,661
Issued: Mar. 1, 1966
Appl. No.: 333,026
Filed: Dec. 24, 1963

[51] Int. Cl.[2] ..... B65B 43/42; B67C 3/00

[52] U.S. Cl. ..... 141/160; 141/179; 141/180; 141/242

[58] Field of Search ..... 141/180, 157, 158, 159, 141/160, 161, 242, 179

[56] References Cited

U.S. PATENT DOCUMENTS

| | | | |
|---|---|---|---|
| Re. 25,535 | 3/1964 | Magnuson | 141/159 |
| 2,202,073 | 5/1938 | Wollenweber | 141/159 |
| 2,266,979 | 12/1941 | McIlvried | 141/159 |
| 2,332,232 | 11/1943 | Bleam et al. | 141/180 |
| 2,416,039 | 2/1947 | Albertoliv | 141/180 |
| 2,491,826 | 12/1949 | Meyers et al. | 141/180 |
| 2,550,903 | 5/1951 | Berch | 141/179 |
| 2,620,960 | 12/1952 | Harrington | 141/180 |
| 2,699,283 | 1/1955 | Okulitch et al. | 141/180 |
| 2,709,538 | 5/1955 | Harrington | 141/242 |
| 2,724,336 | 11/1955 | Egerton | 141/242 |
| 2,772,705 | 12/1956 | Anderson | 141/242 |
| 2,825,190 | 3/1958 | Heald | 141/160 |
| 2,850,051 | 9/1958 | Rasmussen | 141/242 |
| 3,065,775 | 11/1962 | Keves | 141/180 |
| 3,067,786 | 12/1962 | Rosen | 141/179 |

*Primary Examiner*—Houston S. Bell, Jr.
*Attorney, Agent, or Firm*—Craig & Antonelli

[57] ABSTRACT

*The present invention provides a simplified control apparatus for a system which fills a plurality of containers with fluid. The control apparatus functions to hold and to advance containers on a continuously moving conveyor while synchronizing the filling cycle for the containers.*

25 Claims, 3 Drawing Figures

INVENTOR
Sidney Rosen

BY Walter G. Finch
ATTORNEY

INVENTOR
Sidney Rosen

BY Walter G. Finch
ATTORNEY

CONTAINER FILLING SYSTEM

Matter enclosed in heavy brackets [ ] appears in the original patent but forms no part of this reissue specification; matter printed in italics indicates the additions made by reissue.

This invention relates generally to a handling system for fluids, and more particularly it pertains to apparatus for filling containers on a continuously moving conveyer.

One object of this invention is to provide a simplified apparatus for synchronizing the filling stroke of a reciprocating pump with the positioning of fluid receptacle upon a conveyer belt.

Another object of this invention is to provide a no-bottle no-fill arrangement to prevent spillage of fluid in automatic bottling machines.

To provide a rapid acting automatic bottle filling machine which utilizes the return stroke time of a filling pump to eject filled bottles and position empty bottles for filling, is still another object of this invention.

Another object of this invention is to provide a compressed air assisted arrangement for holding and advancing containers on a continuously moving conveyer belt of a filling machine.

Other objects and attendant advantages of this invention will become apparent from the following detailed specification and accompanying drawings in which.

Figure 1:
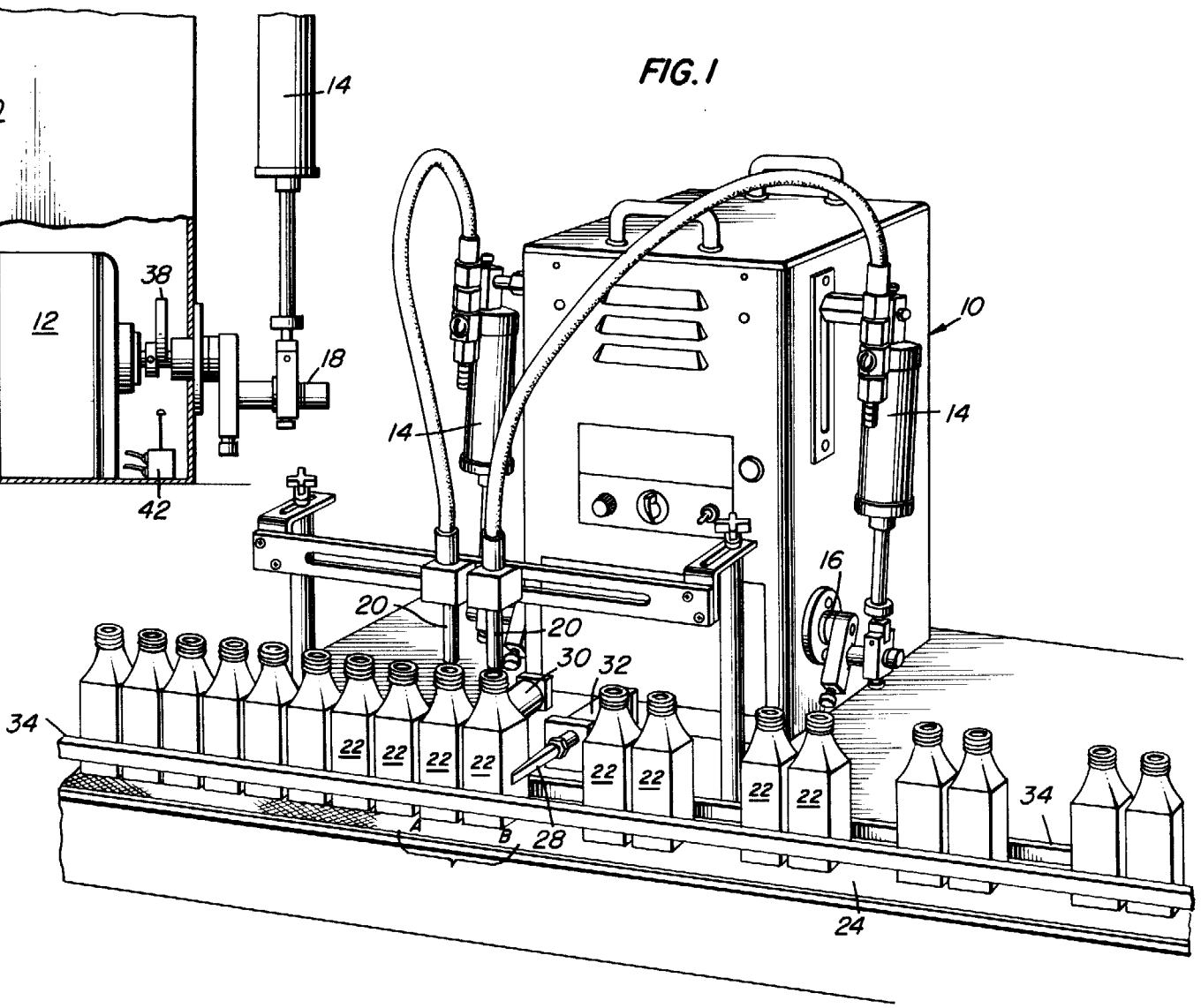
FIG. 1 is a perspective view of an automatic bottle filling machine embodying features of the invention.
Figure 2:
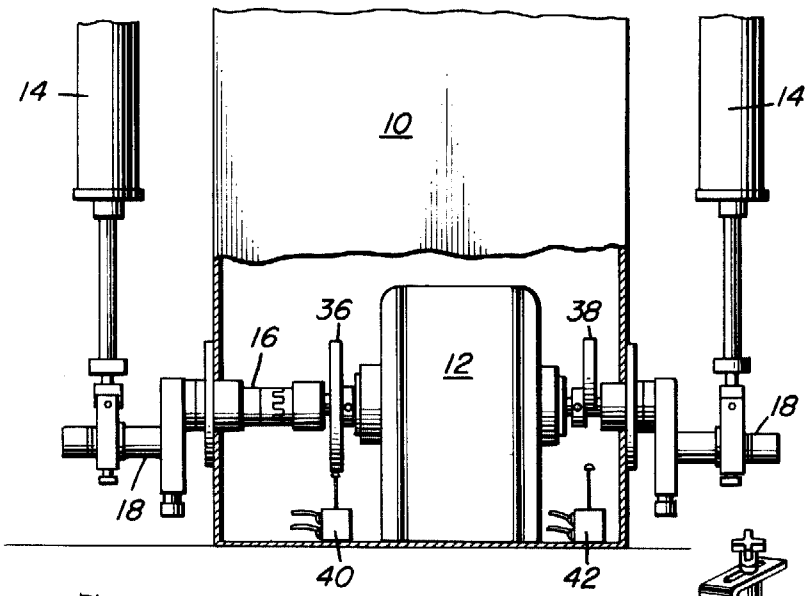
FIG. 2 is a cut away front elevation of a pump for the arrangement shown in FIG. 1.

This machine uses a calibrated position fluid dispensing pump which is described in detail in my U.S. Letters Pat. No. 2,807,213 entitled "Filling Machine" which issued Sept. 24, 1957.

This filling machine or pump is designated by reference number 10 in the present drawings. A motor 12 is used to drive a pair of predetermined capacity reciprocating pump cylinders 14 by means of a shaft 16 and adjustable stroke cranks 18.

During one half revolution of the shaft 16, the cylinders 14 are caused to suck a measured charge of fluid from a supply tank (not shown). During the other half revolution of the shaft 16, each measured charge is ejected through a nozzle 20, with suitable valving being provided to prevent backward flow.

Bottles 22 positioned upon a conveyer belt 24 are held in position under these nozzles 20 during the ejection of fluid therefrom and are replaced by empty bottles during the recharging stroke of the cylinders 14.

Figure 3:
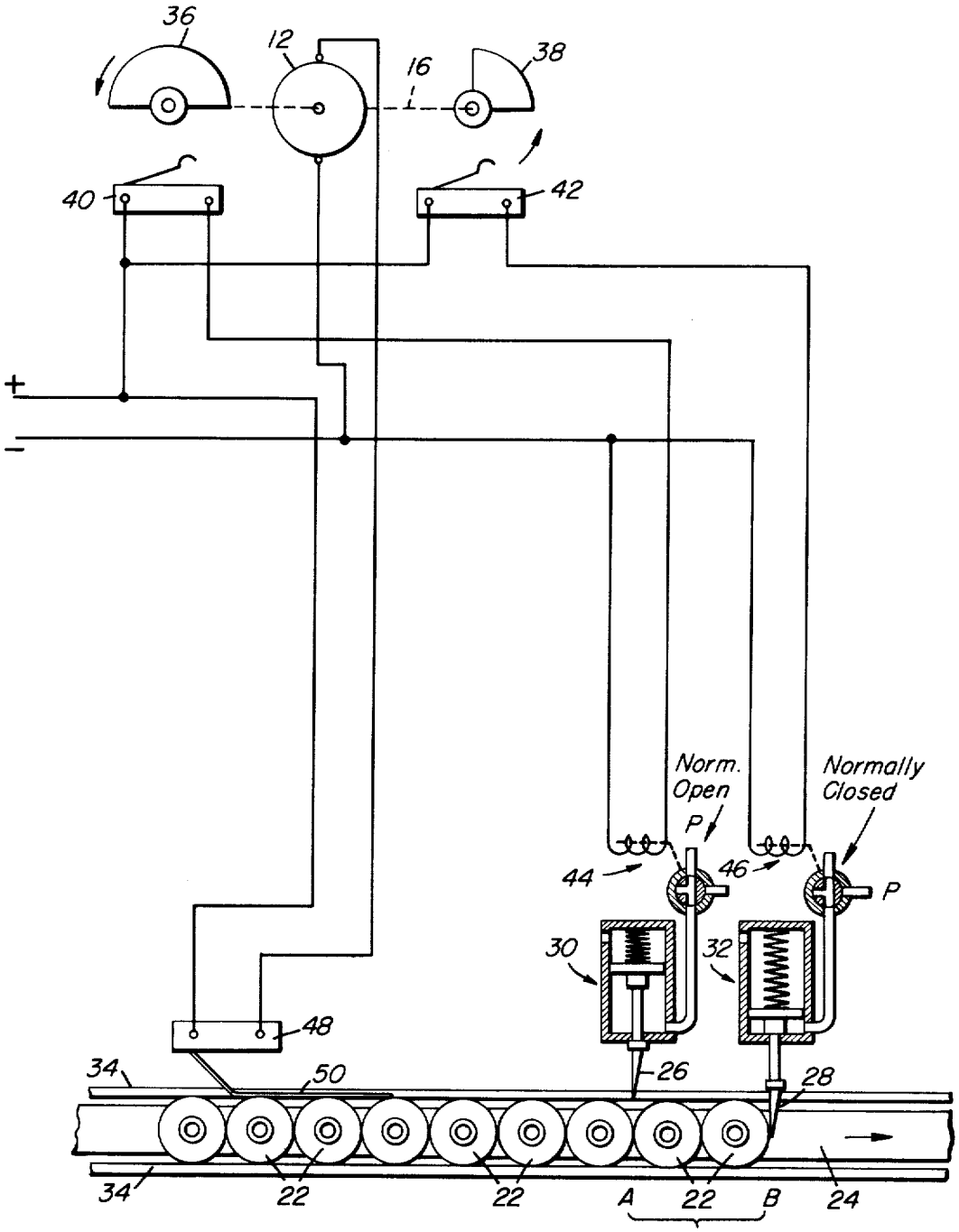
FIG. 3 is a schematic diagram of an electrical circuit for controlling the movement of bottles upon a conveyer by the cycling of the pump.

The conveyer belt 24 moves continuously in the direction shown by the arrow in FIGS. 1 and 3, delivering bottles 22 from the left or upstream side to the right or downstream side.

As best shown in plan view in FIG. 3, the bottles 22 are arranged to be held stationary against the movement of conveyer belt 24 by means of pointed separation bars 26 and 28. The bar 26 will be referred to as the upstream bar and bar 28 as the downstream bar.

The space between the bars 26 and 28 is the filling area directly below the filler nozzles 20 and designated by the bracket A–B.

The bars 26 and 28 are moved out of the path of the bottles 22 by means of electrically controlled air cylinders or actuators 30 and 32, respectively. The bottles 22 are confined in a single linear path upon the conveyer belt 24 by a spaced pair of rails 34 so as to resist any sideward displacement and to pass accurately under the nozzles 20.

A pair of cams 36 and 38 are mounted upon the shaft 16 of the motor 12 which drives the pump cylinders and these cams 36 and 38 are positioned to engage the actuators of a pair of microswitches 40 and 42, respectively. Microswitch 40 is wired to a valving solenoid 44 of a bar actuating cylinder 30, while the microswitch 42 is connected to a valving solenoid 46 of the other bar actuating cylinder 32.

At a distance of several widths of the bottles 22 upstream from the filling area A–B, a microswitch 48 is mounted having an elongated sensing finger 50 arranged to be normally in the path of the bottles. This microswitch 48 is wired to the pump motor 12 and controls the application of power thereto.

Let there be assumed there is a full complement of empty bottles 22 in place and that they are halted against the extended stop 28 as shown in FIG. 3; and the motor 12 is running and that the cams 36 and 38 are turning in the direction of the curved arrows. The cranks 16, then, are beginning an upstroke and the pumps start to eject their measured charge of fluid through the nozzle 20 into the bottles 22 thereunder in area A–B.

The air cylinder or actuator 30 is attached to the air pressure source P in a normally open valve manner and the air cylinder or actuator 32 in a normally closed valve manner, the upstream bar 28 is extended as shown.

Midway of this ejecting stroke of the pump, cam 36 closed microswitch 40 which causes bar 26 to spring extend in readiness to hold back all bottles upstream of area A–B. At the end of the eject stroke of the pump, cam 38 closes microswitch 42. This causes downstream bar 28 to power retract from the path of the bottles 22. The upstream bar 26 continues to interpose, however, and so only the two filled bottles 32 in area A–B are allowed to be carried off by the moving belt 24.

The pump cylinders 14 are now sucking a charge of fluid. Midway of this charging stroke, the cams 36 and 38 both open their respective microswitches 40 and 42. The upstream bar 26 power retracts, and the downstream bar 28 spring-extends allowing the area A–B to refill with a pair of empty bottles 22. The cycle is now complete and repeats as related.

After the completion of an eject stroke of the pump should there be no complement of empty bottles on the belt 24 the pump motor 12 is stopped as the last bottle 22 moves beyond the finger 50 of microswitch 48. Thus, no fluid spillage is caused by nozzles 20 possibly dispensing into an empty area A–B.

If square bottles are to be filled the upstream bar 26 may be modified to be a right angle rubber shoe instead of a pointed structure to frictionally engage the first upstream bottle 22 against the opposite guide rail 34. This is to avoid the difficulty of interposing a pointed configuration between such adjacent bottles.

Obviously many modifications and variations of the present invention are possible in light of the above teachings. It is, therefore, to be understood that within the scope of the appended claims the invention may be practiced otherwise than as specifically described.

What is claimed is:

1. A system for filling a plurality of containers with fluid, comprising, structure including a pair of spaced movable members defining a filling area, continuously operating means sequentially passing said containers into and out of said filling area, pump means delivering a predetermined amount of said fluid to said containers while within said filling area, first and second means responsive to the operation of said pump means to automatically control the respective movement of each of said movable members, one of said movable members retaining a portion of said containers within said filling area to be filled by said pump means while the other of said movable members separates said portion of said containers from the remainder thereof, said one movable member releasing said portion of said containers when filled and then returning to the retaining position, said other of said movable members releasing said remainder of said containers to permit another portion thereof to pass into said filling area and then returning to the retaining position to separate said another portion of containers from the remaining containers.

2. A system for filling a plurality of containers with fluid, comprising, structure including a pair of spaced, movable members defining a filling area, continuously operating means sequentially passing said containers into and out of said filling area, pump means delivering a predetermined amount of said fluid to said containers while within said filling area, first means automatically extending one said movable members to retain a portion of said containers in the filling area to be filled by said pump means and then retracting said one movable member to permit said portion of containers, when filled, to be passed out of said filling area, and second means automatically extending the other of said movable members to separate the remainder of said containers from said portion thereof passing out of said filling area and then retracting said other movable member to permit another portion of containers to pass into said filling area.

3. The system as recited in claim 2 and additionally, means responsive to the presence of at least one container before said filling area to power said pump means, whereby when said at least one container is absent said pump means is inoperative.

4. The system as recited in claim 2, wherein said continuously operating means is a conveyor.

5. The system as recited in claim 2, wherein said pump means includes a shaft and said first means and second means each include a cam mounted thereon, a switch responsive to said cam, and solenoid actuated cylinder means responsive to said switch and having its piston connected with a movable member.

6. A system for filling a plurality of containers with fluid, comprising, structure including a pair of spaced movable members defining a filling area, continuously operating means sequentially passing a pair of said containers into and out of said filling area, a pair of pump means each delivering a predetermined amount of said fluid to its respective container while in said filling area, a shaft connecting said pair of pump means with each other for simultaneous operation, first actuating means including a first cam mounted on said shaft to automatically extend one said movable members to retain said pair of containers in said filling area to be filled by said pair of pump means and retract said one movable member to permit said pair of containers, when filled, to pass out of said filling area, and second actuating means including a second cam mounted on said shaft to automatically extend the other of said movable members to separate the remainder of said containers from said pair thereof passing out of said filling area and then retract said other movable member to permit another pair of containers to pass into said filling area.

*7. A system for filling a plurality of containers with fluid, comprising, means including a pair of spaced movable members defining a filling area, means sequentially passing said containers into and out of said filling area along a predetermined path, pump means delivering a predetermined amount of fluid to said containers while within said filling area, and control means including first and second means responsive to the operation of said pump means to automatically control the respective movement of each of said movable members, one of said movable members retaining a portion of said containers within said filling area to be filled by said pump means while the other of said movable members separates said portion of said containers from the remainder thereof, said one movable member releasing said portion of said containers when filled and then returning to the retaining position, said other of said movable members releasing said remainder of said containers to permit another portion thereof to pass into said filling area and then returning to the retaining position to separate said another portion of containers from the remaining containers, and third means including a third member which senses the presence of at least one container along said path and is operable to stop the operating cycle in the absence of said at least one container to prevent fluid spillage.*

*8. A system according to claim 7, wherein only a single third member is provided.*

*9. A system according to claim 8, wherein said third member is located along said path outside said filling area.*

*10. A system according to claim 9, wherein said third means is operable to open the energizing circuit of a motor driving said pump means.*

*11. A system according to claim 7, wherein said third member is located along said path outside said filling area.*

*12. A system according to claim 7, wherein said third means is operable to open the energizing circuit of a motor driving said pump means.*

*13. A system for filling a plurality of containers with fluid, comprising, a pair of spaced, movable members defining a filling area, continuously operating means sequentially passing said containers into and out of said filling area along a predetermined path, pump means delivering a predetermined amount of fluid to said containers while within said filling area, and control means for controlling the operating cycle of the system including first means automatically extending one said movable members to retain a portion of said containers in the filling area to be filled by said pump means and then retracting said one movable member to permit said portion of containers, when filled, to be passed out of said filling area, second means automatically extending the other of said movable members to separate the remainder of said containers from said portion thereof passing out of said filling area and then retracting said other movable member to permit another portion of containers to pass into said filling area, and third means consisting of a single sensor disposed along said path for sensing the presence of at least one container to be filled*

*in said filling area and for interrupting the operating cycle in the absence of said container.*

*14. A system according to claim 13, wherein said third means senses the presence of a predetermined number of containers to be filled.*

*15. A system according to claim 13, wherein said third means is operable to assure that a predetermined number of containers is always present in said filling area before enabling said pump means to deliver the predetermined amount.*

*16. A system according to claim 13, wherein said sensor is located along said path outside said filling area.*

*17. The system as recited in claim 13, wherein said third means is responsive to the presence of at least one container entering said filling area to energize said pump means, whereby when said at least one container is absent said pump means is rendered inoperative.*

*18. The system is recited in claim 13, wherein said continuously operating means is a conveyor.*

*19. The system as recited in claim 13, wherein said pump means includes a shaft and said first means and second means each include a cam mounted thereon, a switch responsive to said cam, and solenoid actuated cylinder means responsive to said switch and having its piston connected with a movable member.*

*20. A system for filling a plurality of containers with fluid, comprising, a pair of spaced movable members defining a filling area, continuously operating means sequentially passing a predetermined number of said containers into and out of said filling area, a plurality of pump means each delivering a predetermined amount of fluid to its respective container while in said filling area, a shaft connecting said pump means with each other for simultaneous operation, first actuating means for automatically extending one said movable members to retain said containers in said filling area to be filled by said pump means and for retracting said one movable member to permit said containers, when filled, to pass out of said filling area, second actuating means for automatically extending the other of said movable members to separate the remainder of containers which are present upstream thereof, from said predetermined number passing out of said filling area and for then retracting said other movable member to permit another predetermined number of containers to pass into said filling area, and control means operatively connected with said first and second actuating means and including sensing means for sensing the presence of said predetermined number of containers to be passed into said filling area to thereby enable operation of said pump means to fill said containers only in the presence of the predetermined number of said containers in said filling area.*

*21. A system according to claim 20, wherein only a single sensing means is used.*

*22. A system according to claim 21, wherein said sensing means is located along a path of the containers passed by said continuously operating means.*

*23. A system according to claim 22, wherein said sensing means is located upstream of said second movable member.*

*24. A system according to claim 20, wherein said sensing means is located upstream of said second movable member.*

*25. A system according to claim 20, wherein said sensing means is located along the path of the containers passed by said continuously operating means.*

* * * * *